United States Patent
Wu et al.

(10) Patent No.: US 9,520,596 B2
(45) Date of Patent: Dec. 13, 2016

(54) RESIN FOR NEGATIVE ELECTRODE OF LITHIUM ION BATTERY, RESIN COMPOSITION, SLURRY, NEGATIVE ELECTRODE, AND LITHIUM ION BATTERY

(71) Applicant: Chi Mei Corporation, Tainan (TW)

(72) Inventors: Hsiu-Mei Wu, Tainan (TW); Chan-Li Hsueh, Tainan (TW); Chung-Ping Li, Tainan (TW)

(73) Assignee: Chi Mei Corporation, Tainan (TW)

( * ) Notice: Subject to any disclaimer, the term of this patent is extended or adjusted under 35 U.S.C. 154(b) by 346 days.

(21) Appl. No.: 14/475,588

(22) Filed: Sep. 3, 2014

(65) Prior Publication Data

US 2015/0287994 A1   Oct. 8, 2015

(30) Foreign Application Priority Data

Apr. 8, 2014   (TW) .............................. 103112835 A

(51) Int. Cl.
*H01M 4/62* (2006.01)
*C08F 291/00* (2006.01)
(Continued)

(52) U.S. Cl.
CPC ............ *H01M 4/622* (2013.01); *C08F 220/14* (2013.01); *C08F 220/18* (2013.01); *C08F 291/00* (2013.01);
(Continued)

(58) Field of Classification Search
CPC ...... H01M 4/622; H01M 4/133; C08F 220/14; C08F 220/18; C08F 291/00; C09D 133/08; C09D 133/12
See application file for complete search history.

(56) References Cited

U.S. PATENT DOCUMENTS

| | | | |
|---|---|---|---|
| 8,314,182 B2* | 11/2012 | Ha ......................... | C08F 285/00 525/80 |
| 2012/0141859 A1* | 6/2012 | Murata ................... | B32B 27/32 429/144 |
| 2015/0132644 A1* | 5/2015 | Sonobe ................. | H01M 4/133 429/217 |

FOREIGN PATENT DOCUMENTS

| | | |
|---|---|---|
| CN | 1560943 | 1/2005 |
| JP | H0987571 | 3/1997 |
| | (Continued) | |

OTHER PUBLICATIONS

Guo et al., "Preparation of Fe3O4/SiO2/P(AA-MMA-St) Magnetic-composite Microspheres by Controlled Radical Polymerization," Acta Polymerica Sinica, Nov. 2008, pp. 1082-1088.

(Continued)

*Primary Examiner* — Alix Eggerding
(74) *Attorney, Agent, or Firm* — Jianq Chyun IP Office

(57) ABSTRACT

A resin for a negative electrode of a lithium ion battery including a core section and a cladding layer covering the surface of the core section are provided. The cladding layer is obtained by reacting a first monomer mixture. The first monomer mixture includes an ethylenically unsaturated carboxylic acid ester monomer, a first aromatic vinyl monomer, and an ethylenically unsaturated carboxylic acid monomer. Based on 100 wt % of the first monomer mixture, a content of the ethylenically unsaturated carboxylic acid ester monomer is from 45 to 80 wt %, a content of the first aromatic vinyl monomer is from 5 to 25 wt %, and a content of the ethylenically unsaturated carboxylic acid monomer is from 10 to 43 wt %.

11 Claims, 1 Drawing Sheet

(51) Int. Cl.
  *H01M 4/133* (2010.01)
  *C08F 220/14* (2006.01)
  *C08F 220/18* (2006.01)
  *C09D 133/08* (2006.01)
  *C09D 133/12* (2006.01)
  *C08F 257/02* (2006.01)
  *C08F 297/02* (2006.01)

(52) U.S. Cl.
  CPC ........... *C09D 133/08* (2013.01); *C09D 133/12* (2013.01); *H01M 4/133* (2013.01); *C08F 257/02* (2013.01); *C08F 297/02* (2013.01)

(56) References Cited

FOREIGN PATENT DOCUMENTS

| JP | H10302797 | 11/1998 |
|----|-----------|---------|
| JP | H1125989 | 1/1999 |
| JP | H11149929 | 6/1999 |
| JP | 2004256743 | 9/2004 |
| JP | 2006513554 | 4/2006 |
| JP | 2010021059 | 1/2010 |
| JP | 2012185947 | 9/2012 |
| JP | 2013051076 | 3/2013 |
| JP | 2013093123 | 5/2013 |
| WO | 2012115096 | 8/2012 |

OTHER PUBLICATIONS

"Office Action of Taiwan Counterpart Application", issued on Jun. 6, 2016, p. 1-p. 6.

"Office Action of Taiwan Counterpart Application", issued on May 13, 2015, p. 1-p. 4.

"Office Action of Japan Counterpart Application", issued on Mar. 22, 2016, p. 1-p. 11.

\* cited by examiner

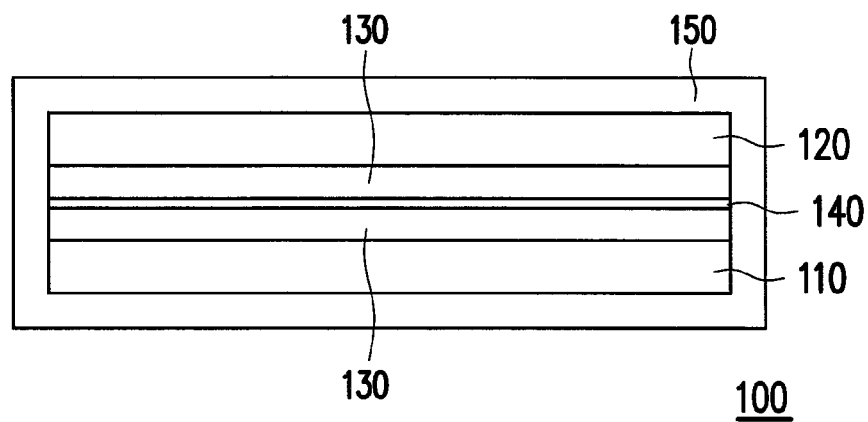

RESIN FOR NEGATIVE ELECTRODE OF LITHIUM ION BATTERY, RESIN COMPOSITION, SLURRY, NEGATIVE ELECTRODE, AND LITHIUM ION BATTERY

CROSS-REFERENCE TO RELATED APPLICATION

This application claims the priority benefit of Taiwan application serial no. 103112835, filed on Apr. 8, 2014. The entirety of the above-mentioned patent application is hereby incorporated by reference herein and made a part of this specification.

BACKGROUND OF THE INVENTION

Field of the Invention

The invention relates to a resin for a negative electrode of a lithium ion battery, a resin composition for a negative electrode of a lithium ion battery, a slurry for a negative electrode of a lithium ion battery, a negative electrode, and a lithium ion battery. More particularly, the invention relates to a resin for a negative electrode of a lithium ion battery capable of fabricating a negative electrode of a lithium ion battery and a resin composition for a negative electrode of a lithium ion battery, a slurry for a negative electrode of a lithium ion battery, and a negative electrode formed thereby, and a lithium ion battery having the negative electrode in which the adhesion between a negative electrode layer and a current collector is good.

Description of Related Art

The secondary battery is used as a storage battery for, for instance, a portable device such as a personal computer or a mobile phone, a hybrid vehicle, or an electric car, wherein a secondary lithium ion battery is most widely used for the secondary battery. With the increasing market demand for the secondary lithium ion battery having the characteristics of, for instance, repeated charge and discharge, lightweight, high voltage value, and high energy density, the demand for performance of the lithium ion battery in, for instance, lightweight and durability, high voltage, high energy density, and high safety is also rising.

In general, the electrode for a lithium ion battery is formed by attaching an electrode active substance to a current collector with a binder. Common binders include, for instance, a mixture of a fluorine-based polymer and an organic solvent such as polyvinylidene fluoride (PVDF). However, since the adhesion between known binders and the current collector is poor, the electrical properties of the lithium ion battery are not readily improved. Moreover, the organic solvent in the binders causes environmental pollution. Therefore, the binders are not suitable for application.

As a result, how to alleviate the issues of insufficient adhesion between the binder and the current collector and environmental pollution so as to achieve the current industrial needs is a current issue those skilled in the art urgently need to solve.

SUMMARY OF THE INVENTION

Accordingly, the invention provides a resin for a negative electrode of a lithium ion battery, a resin composition for a negative electrode of a lithium ion battery, and a slurry for a negative electrode of a lithium ion battery having good adhesion with a current collector and are environmentally friendly.

The invention provides a resin for a negative electrode of a lithium ion battery including a core section and a cladding layer covering the surface of the core section. The cladding layer is obtained by reacting a first monomer mixture. Specifically, the first monomer mixture includes an ethylenically unsaturated carboxylic acid ester monomer, a first aromatic vinyl monomer, and an ethylenically unsaturated carboxylic acid monomer. Based on 100 wt % of the first monomer mixture, the content of the ethylenically unsaturated carboxylic acid ester monomer is from 45 to 80 wt %, the content of the first aromatic vinyl monomer is from 5 to 25 wt %, and the content of the ethylenically unsaturated carboxylic acid monomer is from 10 to 43 wt %.

In an embodiment of the invention, the content of the ethylenically unsaturated carboxylic acid ester monomer is from 55 to 75 wt %.

In an embodiment of the invention, the content of the first aromatic vinyl monomer is from 5 to 20 wt %.

In an embodiment of the invention, the content of the ethylenically unsaturated carboxylic acid monomer is from 10 to 30 wt %.

In an embodiment of the invention, based on 100 parts by weight of the resin for a negative electrode of a lithium ion battery, the content of the core section is from 70 to 80 parts by weight and the content of the cladding layer is from 20 to 30 parts by weight.

In an embodiment of the invention, the core section is obtained by reacting a second monomer mixture; the second monomer mixture includes a second aromatic vinyl monomer, a conjugated diene monomer, and a vinyl cyanide monomer. Based on 100 wt % of the second monomer mixture, the content of the second aromatic vinyl monomer is from 40 to 50 wt %, the content of the conjugated diene monomer is from 45 to 55 wt %, and the content of the vinyl cyanide monomer is from 2 to 10 wt %.

The invention also provides a resin composition for a negative electrode of a lithium ion battery including the above resin for a negative electrode of a lithium ion battery and a solvent.

The invention also provides a slurry for a negative electrode of a lithium ion battery including the above resin composition for a negative electrode of a lithium ion battery and an active substance.

The invention also provides a negative electrode of a lithium ion battery including a current collector and a negative electrode layer located on the surface of the current collector, wherein the negative electrode layer is formed by processing steps of the above slurry for a negative electrode of a lithium ion battery.

The invention also provides a lithium ion battery including a positive electrode, the above negative electrode of a lithium ion battery separately disposed from the positive electrode, an electrolyte located between the positive electrode and the negative electrode, and a package structure covering the positive electrode, the negative electrode, and the electrolyte.

Based on the above, since the resin composition for a negative electrode of a lithium ion battery and the slurry for a negative electrode of a lithium ion battery contain a specific resin for a negative electrode of a lithium ion battery, a negative electrode of a lithium ion battery in which the adhesion between the negative electrode layer and the current collector is good can be fabricated, wherein the resin for a negative electrode of a lithium ion battery is an environmentally friendly material. Accordingly, the resin for a negative electrode of a lithium ion battery, the resin composition for a negative electrode of a lithium ion battery, the slurry for a negative electrode of a lithium ion battery, and the negative electrode of a lithium ion battery fabricated thereby of the invention are suitable for preparing a lithium ion battery having good electrical properties.

To make the above features and advantages of the invention more comprehensible, several embodiments are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic cross-sectional diagram of a lithium ion battery according to an embodiment of the invention.

DESCRIPTION OF THE EMBODIMENTS

<Resin for Negative Electrode of Lithium Ion Battery>

The invention provides a resin for a negative electrode of a lithium ion battery including a core section and a cladding layer covering the surface of the core section. The cladding layer partially or completely covers the surface of the core section. The preparation method of each of the core section, the cladding layer, and the negative electrode of a lithium ion battery is described in detail below.

Cladding Layer

The cladding layer is obtained by reacting a first monomer mixture. Specifically, the first monomer mixture includes an ethylenically unsaturated carboxylic acid ester monomer, a first aromatic vinyl monomer, and an ethylenically unsaturated carboxylic acid monomer.

Specific examples of the ethylenically unsaturated carboxylic acid ester monomer include, but are not limited to, an alkyl acrylate having a $C_1$ to $C_8$ alkyl group, such as methyl acrylate, ethyl acrylate, butyl acrylate, or 2-ethylhexyl acrylate; an alkyl methacrylate having a $C_1$ to $C_4$ alkyl group, such as methyl methacrylate or ethyl methacrylate; an alkyl maleate having a $C_1$ to $C_4$ alkyl group, such as dimethyl maleate or diethyl maleate; an alkyl itaconate having a $C_1$ to $C_4$ alkyl group, such as dimethyl itaconate; an alkyl fumarate having a $C_1$ to $C_4$ alkyl group, such as monomethyl fumarate, monoethyl fumarate, dimethyl fumarate, or diethyl fumarate, or a combination of the compounds. The ethylenically unsaturated carboxylic acid ester monomer can be used alone or in multiple combinations.

Specific examples of the ethylenically unsaturated carboxylic acid ester monomer preferably include methyl methacrylate, butyl acrylate, 2-ethylhexyl acrylate, or a combination of the compounds.

Based on 100 wt % of the first monomer mixture, the content of the ethylenically unsaturated carboxylic acid ester monomer is from 45 to 80 wt %, preferably from 55 to 80 wt %.

Specific examples of the first aromatic vinyl monomer include, but are not limited to, styrene, α-methylstyrene, methyl-α-methylstyrene, vinyl toluene, and divinyl benzene, or a combination of the compounds. The first aromatic vinyl monomer can be used alone or in multiple combinations.

Specific examples of the first aromatic vinyl monomer preferably include styrene, α-methylstyrene, or a combination of the compounds.

Based on 100 wt % of the first monomer mixture, the content of the first aromatic vinyl monomer is from 5 to 25 wt %, preferably from 5 to 20 wt %.

Specific examples of the ethylenically unsaturated carboxylic acid monomer include, but are not limited to, acrylic acid, methacrylic acid, maleic acid, crotonic acid, itaconic acid, fumaric acid, or a combination of the compounds. The ethylenically unsaturated carboxylic acid monomer can be used alone or in multiple combinations.

Specific examples of the ethylenically unsaturated carboxylic acid monomer preferably include acrylic acid, methacrylic acid, itaconic acid, or a combination of the compounds.

Based on 100 wt % of the first monomer mixture, the content of the ethylenically unsaturated carboxylic acid monomer is from 10 to 43 wt %, preferably from 10 to 30 wt %.

The first monomer mixture can further include other copolymerizable monomers without significantly impairing the effect of the invention. Specific examples of the other copolymerizable monomers include, but are not limited to, a vinyl cyanide monomer, a conjugated diene monomer, or an amide monomer. The specific examples of the vinyl cyanide monomer and the conjugated diene monomer are the same as the specific examples of the vinyl cyanide monomer and the conjugated diene monomer of the core section described later, and are not repeated herein.

Specific examples of the amide monomer include, but are not limited to, acrylamide, methacrylamide, N-methylolacrylamide, N-methylol methacrylamide, N,N-dimethylacrylamide, N,N-dimethylmethacrylamide, or a combination of the compounds. The amide monomer can be used alone or in multiple combinations.

Based on 100 parts by weight of the resin for a negative electrode of a lithium ion battery, the content of the cladding layer is from 20 to 30 parts by weight, preferably from 20 to 28 parts by weight, and more preferably from 20 to 25 parts by weight.

Core Section

In an embodiment of the invention, the core section is obtained by performing a polymerization reaction on a second monomer mixture under the existence of an emulsifier, a polymerization initiator, an activating agent, or a combination thereof. The second monomer mixture includes a second aromatic vinyl monomer, a conjugated diene monomer, and a vinyl cyanide monomer.

The specific examples of the second aromatic vinyl monomer are the same as the specific examples of the first aromatic vinyl monomer used to form the cladding layer, and are not repeated herein. Specific examples of the second aromatic vinyl monomer preferably include styrene. Based on 100 wt % of the second monomer mixture, the content of the second aromatic vinyl monomer is from 40 to 50 wt %, preferably from 40 to 45 wt %.

Specific examples of the conjugated diene monomer include, but are not limited to, 1,3-butadiene, isoprene, 1,3-pentadiene, 2-ethyl-1,3-butadiene, 2,3-dimethylbutadiene, 2-methylpentadiene, 4-methylpentadiene, 2,4-hexadiene, or a combination of the compounds. The conjugated diene monomer can be used alone or in multiple combinations. Specific examples of the conjugated diene monomer preferably include 1,3-butadiene. Based on 100 wt % of the second monomer mixture, the content of the conjugated diene monomer is from 45 to 55 wt %, preferably from 45 to 50 wt %.

Specific examples of the vinyl cyanide monomer include, but are not limited to, acrylonitrile, α-methacrylonitrile, or a combination of the compounds. The vinyl cyanide monomer can be used alone or in multiple combinations. Specific examples of the vinyl cyanide monomer preferably include acrylonitrile. Based on 100 wt % of the second monomer mixture, the content of the vinyl cyanide monomer is from 2 to 10 wt %, preferably from 2 to 8 wt %.

Based on 100 wt % of the second monomer mixture, the content of the other copolymerizable monomers is from 2 to 10 wt %, preferably from 2 to 8 wt %.

In an embodiment of the invention, based on 100 parts by weight of the resin for a negative electrode of a lithium ion battery, the content of the core section is from 70 to 80 parts by weight, preferably from 72 to 80 parts by weight, and more preferably from 75 to 80 parts by weight.

Preparation Method of Resin for Negative Electrode of Lithium Ion Battery

The preparation method of the resin for a negative electrode of a lithium ion battery includes the following steps: (1) a step in which a core section is formed, and (2) a step in which a cladding layer is formed on the surface of the core section.

(1) Step of Forming Core Section

An emulsion polymerization reaction is performed on the second aromatic vinyl monomer, the conjugated diene monomer, and the vinyl cyanide monomer under the existence of a solvent, an emulsifier, and a polymerization initiator to form a solution of core section.

Specific examples of the solvent include, but are not limited to, water, or alcohol such as methanol, ethanol, n-propanol, isopropanol, or a combination of the solvents. Based on 100 wt % of the second monomer mixture, the content of the solvent can be from 100 to 1000 wt %.

Specific examples of the emulsifier include, but are not limited to, an anionic surfactant such as higher alcohol sulfate, alkyl benzene sulfonate (such as sodium dodecylbenzenesulfonate), alkyldiphenylether disulfonate, aliphatic sulfonate, or aliphatic carboxylate; a nonionic surfactant such as polyethylene glycol alkyl ester, alkyl phenyl ether, or alkyl ether; or a combination of the emulsifiers. Specific examples of the emulsifier preferably include sodium dodecylbenzenesulfonate. Based on 100 wt % of the second monomer mixture, the content of the emulsifier can be from 0.05 to 10 wt %.

The polymerization initiator can be a free radical polymerization initiator. Specific examples of the polymerization initiator include, but are not limited to, a water-soluble polymerization initiator such as potassium persulfate, sodium persulfate, or ammonium persulfate; an oil-soluble polymerization initiator such as cumene hydroperoxide, benzoyl peroxide, t-butyl hydroperoxide, acetyl hydroperoxide, diisopropylbenzene hydroperoxide, 1,1,3,3-tetramethylbutyl hydroperoxide; or a combination of the polymerization initiators. Specific examples of the polymerization initiator preferably include potassium persulfate. Based on 100 wt % of the second monomer mixture, the usage amount of the polymerization initiator can be from 0.01 to 1 wt %.

The emulsion polymerization reaction can also be performed under the existence of a reducing agent or a chain transfer agent.

Specific examples of the reducing agent include ferrous sulfate, sulfite, bisulfite, pyrosulfite, hydrosulfite, bissulfonate, thiosulfate, formaldehyde sulfonate, benzaldehyde sulfonate, carboxylic acid and a salt thereof (such as L-ascorbic acid, isoascorbic acid, tartaric acid, or citric acid), a reducing sugar (such as glucose or sucrose), an amine (such as dimethylaniline or triethanolamine), or a combination of the reducing agents.

Specific examples of the chain transfer agent include an alkyl mercaptan having a $C_6$ to $C_{18}$ alkyl group such as n-hexyl mercaptan, n-octyl mercaptan, t-octyl mercaptan, n-dodecyl mercaptan, t-dodecyl mercaptan, or n-stearyl mercaptan; a xanthate compound such as dimethyl xanthate disulfide or diisopropyl xanthate disulfide; terpinolene; a thiuram compound such as tetramethylthiuram disulfide, tetraethylthiuram disulfide, or tetramethylthiuram monosulfide; a phenolic compound such as 2,6-di-t-butyl-4-methylphenol or styrenated phenol; an allyl compound such as allyl alcohol; a halogenated hydrocarbon compound such as dichloromethane, dibromomethane, or carbon tetrabromide; a vinyl ether such as α-benzyloxy styrene, α-benzyloxy acrylonitrile, or α-benzyloxy acrylamide; triphenylethane, pentaphenylethane, acrolein, methacrolein, thioglycolic acid, thiomalic acid, 2-ethylhexyl thioglycolic acid, α-methylstyrene dimer, or a combination of the chain transfer agents.

The emulsion polymerization reaction can also be performed under the existence of other additives. The other additives can be, for instance, an anti-aging agent, a preservative, a dispersant, a tackifier, or a combination of the other additives.

The emulsion polymerization reaction is not particularly limited, and can include, for instance, batch polymerization, semi-batch polymerization, or seed polymerization. Moreover, the feeding method of the various components is also not particularly limited, and can include, for instance, simultaneous feeding, successive feeding, continuous feeding, and power feeding. The core section can thereby be obtained.

The temperature of the emulsion polymerization reaction can be from 40 to 100° C., preferably from 50 to 90° C. The reaction time of the emulsion polymerization reaction can be from 10 to 40 hours, preferably from 15 to 30 hours.

(2) Step of Forming Cladding Layer on Surface of Core Section

In the solution of core section formed in step (1), the first monomer mixture of, for instance, the ethylenically unsaturated carboxylic acid ester monomer, the first aromatic vinyl monomer, and the ethylenically unsaturated carboxylic acid monomer is added to perform a grafting reaction. A cladding layer can thereby be formed on the surface of the core section.

The temperature of the grafting reaction can be from 40 to 100° C., preferably from 50 to 90° C. The reaction time of the grafting reaction can be from 2 to 10 hours, preferably from 2 to 6 hours.

<Resin Composition For Negative Electrode of Lithium Ion Battery>

The invention also provides a resin composition for a negative electrode of a lithium ion battery including the above resin for a negative electrode of a lithium ion battery and a solvent. Specific examples of the solvent include, but are not limited to, water, or alcohol such as methanol, ethanol, n-propanol, isopropanol, or a combination of the solvents.

Moreover, based on 100 wt % of the resin composition for a negative electrode of a lithium ion battery, the usage amount of the resin for a negative electrode of a lithium ion battery can be from 10 to 40 wt %. Based on 100 wt % of the resin composition for a negative electrode of a lithium ion battery, the usage amount of the solvent can be from 60 to 90 wt %.

The method of forming the resin composition for a negative electrode of a lithium ion battery is not particularly limited. Any method in which the resin for a negative electrode of a lithium ion battery and the solvent are mixed to form the resin composition for a negative electrode of a lithium ion battery can be used. Specifically, the method of mixing the resin for a negative electrode of a lithium ion battery and the solvent includes, for instance, stirring with a magnetic stirrer or a mechanical stirrer.

<Slurry for Negative Electrode of Lithium Ion Battery>

The invention also provides a slurry for a negative electrode of a lithium ion battery including the above resin composition for a negative electrode of a lithium ion battery and an active substance. Moreover, if needed, the slurry for a negative electrode of a lithium ion battery can further include a corrosive, a conductive auxiliary agent, or a tackifier.

Specific examples of the active substance include, but are not limited to, a conductive carbon material such as natural graphite or artificial graphite. The artificial graphite is, for instance, a resulting material of a graphitization treatment performed on, for instance, petroleum, coal asphalt, or coke. The conductive polymer is, for instance, a polyacene organic semiconductor, polyacetylene, poly(p-phenylene), or a combination of the carbides.

The only limitation of the corrosive is that the corrosive needs to be able to partially corrode the surface of the current collector described later such that the surface of the current collector is roughened. Specific examples of the corrosive include, but are not limited to, an organic acid such as formic acid, acetic acid, oxalic acid, malonic acid, malic acid, tartaric acid, succinic acid, or propionic acid; or an inorganic acid such as hydrochloric acid, phosphoric acid, or sulfuric acid.

Specific examples of the conductive auxiliary agent include, but are not limited to, carbon black such as acetylene black or Ketjenblack; carbon nano-fiber such as vapor-grown carbon fiber; conductive carbon such as carbon nano-tube or micro powder graphite, or a combination of the carbides.

Specific examples of the tackifier include, but are not limited to, carboxymethyl cellulose, methyl cellulose, hydroxymethyl cellulose, ethyl cellulose, polyvinyl alcohol, polyacrylic acid (salt), oxidized starch, phosphorylated starch, casein, or a combination of the tackifiers. Specific examples of the tackifier preferably include methyl cellulose.

Moreover, the slurry for a negative electrode of a lithium ion battery can further include various additives such as a dispersant or a stabilizer. Specific examples of the dispersant include, but are not limited to, for instance, sodium hexametaphosphate, sodium tripoly phosphate, sodium pyrophosphate, or sodium polyacrylate. Specific examples of the stabilizer include, but are not limited to, for instance, a nonionic or an anionic surfactant.

The method of forming the slurry for a negative electrode of a lithium ion battery is not particularly limited. Any method in which the resin composition for a negative electrode of a lithium ion battery and the active substance are mixed can be used. Specifically, the method of mixing the resin composition for a negative electrode of a lithium ion battery and the active substance includes, for instance, stirring with a magnetic stirrer or a mechanical stirrer. In the slurry for a negative electrode of a lithium ion battery of the invention, based on 100 parts by weight of the active substance, the usage amount of the resin composition for a negative electrode of a lithium ion battery is from 0.1 to 10 parts by weight, preferably from 0.5 to 5 parts by weight.

<Lithium Ion Battery>

The resin for a negative electrode of a lithium ion battery, the resin composition for a negative electrode of a lithium ion battery, and the slurry for a negative electrode of a lithium ion battery of the invention can be applied to various types of lithium ion batteries. For instance, FIG. 1 is a schematic cross-sectional diagram of a lithium ion battery according to an embodiment of the invention. Since the adhesion between the resin for a negative electrode of a lithium ion battery, the resin composition for a negative electrode of a lithium ion battery, and the slurry for a negative electrode of a lithium ion battery of the invention and a current collector is good, the electrical properties of the lithium ion battery can be improved. The structure of each part of the lithium ion battery is described in detail below.

In FIG. 1, a lithium ion battery 100 includes a positive electrode 110, a negative electrode 120, an electrolyte 130, an isolation film 140, and a package structure 150. The isolation film 140, the positive electrode 110, and the negative electrode 120 are separated and parallelly disposed. Specifically, the isolation film 140 is located between the positive electrode 110 and the negative electrode 120 for separating the electrolyte 130. More specifically, the electrolyte 130 is located between the positive electrode 110 and the negative electrode 120 and is separated into two parts through the isolation film 140.

The positive electrode 110 includes a positive electrode metal foil and a positive electrode material, and the positive electrode material is disposed on the positive electrode metal foil through coating or sputtering. The positive electrode metal foil is, for instance, a copper foil, an aluminum foil, a nickel foil, or a high-conductivity stainless steel foil. Specific examples of the positive electrode material include a transition metal oxide such as $MnO_2$, $MoO_3$, $V_2O_5$, $V_6O_{13}$, $Fe_2O_3$, or $Fe_3O_4$, a lithium-containing composite oxide such as $LiCoO_2$, $LiMnO_2$, $LiNiO_2$, or $LiFePO_4$, a transition metal sulfide such as $TiS_2$, $TiS_3$, $MoS_3$, or $FeS_2$, a metal fluoride such as $CuF_2$ or $NiF_2$, or a combination of the materials.

The negative electrode 120 includes a current collector and a negative electrode layer located on the surface of the current collector. The negative electrode of a lithium ion battery is formed by processing steps such as coating the above-mentioned slurry for a negative electrode of a lithium ion battery on a current collector and then drying. The current collector is, for instance, a copper foil, an aluminum foil, a nickel foil, or a high-conductivity stainless steel foil. The method of coating the slurry for a negative electrode of a lithium ion battery on the current collector can include a known method such as a reverse roll method, a doctor blade method, a gravure printing method, or an air blade method. The drying method can include, for instance, placement drying, an air dryer, a warm air dryer, an infrared heater, or a far-infrared heater. The drying temperature is generally at least 50° C.

The electrolyte 130 includes a lithium salt and an organic solvent. The lithium salt is, for instance, $LiPF_6$, $LiBF_4$, $LiAsF_6$, $LiSbF_6$, $LiC(SO_2CF_3)_3$, $LiN(SO_2CF_3)_2$, or a combination thereof. The organic solvent is, for instance, γ-butyl lactone, ethylene carbonate (EC), propylene carbonate, diethyl carbonate (DEC), propyl acetate (PA), dimethyl carbonate (DMC), ethylmethyl carbonate (EMC), or a combination thereof.

The material of the isolation film 140 is, for instance, an insulating material, and the insulating material can be polyethylene (PE), polypropylene (PP), or a multilayer composite structure of the materials, such as PE/PP/PE.

The package structure 150 is used to cover the positive electrode 110, the negative electrode 120, the electrolyte 130, and the isolation film 140. The material of the package structure 150 is, for instance, an aluminum plastic composite film.

EXAMPLES

Example 1 to example 7 and comparative example 1 to comparative example 8 of the lithium ion battery are described below.

Example 1

(1) Preparation of Resin for Negative Electrode of Lithium Ion Battery

In a pressure-resistant reaction vessel, 400 parts by weight of water, 5 parts by weight of sodium dodecylbenzenesulfonate (NaDBS hereinafter), and 100 parts by weight of a monomer mixture used to form the core section were placed. In the monomer mixture used to form the core section, based on 100 wt % of the monomer mixture, acrylonitrile (AN hereinafter) is 5 wt %, styrene (SM hereinafter) is 45 wt %, and butadiene (BD hereinafter) is 50 wt %. Then, after the temperature of the mixture was raised to 65° C. while the mixture was stirred at room temperature, potassium persulfate (KPS hereinafter) used as the polymerization initiator was added, and the mixture was continuously heated and stirred to react for 20 hours. A solution of core section having a solid content (TS %) of 21% can thus be obtained.

Next, in a three-necked flask having a volume of 1000 mL, the solution of core section was added, and the temperature of the solution was raised to 65° C. while the solution was stirred at room temperature. Then, based on 70 parts by weight of solid content of the core section, 30 parts by weight of the monomer mixture used to form the cladding layer was added. In the monomer mixture used to form the cladding layer, based on 100 wt % of the monomer mixture, methyl methacrylate (MMA hereinafter) is 78 wt %, methacrylic acid (MAA hereinafter) is 10 wt %, and styrene (SM hereinafter) is 12 wt %. The monomer mixture was slowly added and the mixture was continuously heated and stirred to react for 4 hours. Then, after the reaction solution was cooled, an aqueous solution of potassium hydroxide was used to adjust the pH to 8 so as to obtain a solution containing the resin for a negative electrode of a lithium ion battery. Next, the unreacted monomer and solvent were removed by using steam distillation to obtain the resin for a negative electrode of a lithium ion battery of example 1.

(2) Preparation of Slurry for Negative Electrode of Lithium Ion Battery 1.5 parts by weight of methyl cellulose (used as tackifier), 1.5 parts by weight of the resin for a negative electrode of a lithium ion battery, 1 part by weight of oxalic acid, 1 part by weight of acetylene black (used as conductive auxiliary agent), and 95 parts by weight of graphite (used as active substance) were added to 100 parts by weight of water. The mixture was mixed and uniformly stirred to obtain a slurry having a TS % of 50%.

(3) Preparation of Negative Electrode of Lithium Ion Battery

The slurry was uniformly coated on a copper foil (used as current collector) by a doctor blade method, wherein the thickness of the slurry was 200 um, and the copper foil was placed in an oven. The copper foil was baked at 80° C. for 30 minutes to dry. Then, the copper foil was rolled to fabricate a negative electrode having a thickness of about 70 um, a width of about 10 cm, and a length of about 30 cm.

(4) Preparation of Lithium Ion Battery

The anode and the cathode were separated by using polypropylene as an isolation film, and the above-mentioned electrolyte was added to the region between the anode and the cathode, wherein the electrolyte is composed of 1 part by volume of ethylene carbonate (EC), 1 part by volume of diethyl carbonate (DEC) (volume ratio of EC and DEC is 1:1), and $LiPF_6$ having a concentration of 1 mole/L.

Lastly, the above structure was sealed with a package structure to complete the fabrication of the lithium ion battery of experimental example 1. Moreover, each of the obtained negative electrode and lithium ion battery was evaluated, wherein the evaluation methods are as described below, and the results thereof are as shown in Table 2.

Example 2 to Example 7

The resin for a negative electrode of a lithium ion battery, the slurry for a negative electrode of a lithium ion battery, the negative electrode of a lithium ion battery, and the lithium ion battery of each of example 2 to example 7 were prepared with the same steps as example 1. However, the difference is: the components and the usage amount of each thereof of the resin for a negative electrode of a lithium ion battery were changed (as shown in Table 2), wherein the compounds corresponding to the abbreviations in Table 2 are as shown in Table 1. Each of the obtained negative electrode and lithium ion battery was evaluated, and the results thereof are as shown in Table 2.

TABLE 1

| Abbreviation | Component |
| --- | --- |
| SM | Styrene |
| BD | 1,3-butadiene |
| AN | Acrylonitrile |
| MMA | methyl methacrylate |
| BA | butyl acrylate |
| 2-EHA | 2-ethylhexyl acrylate |
| α-MS | α-methyl styrene |
| MAA | methacrylic acid |
| AA | acrylic acid |
| IA | itaconic acid |
| AAD | Acrylamide |

Comparative Example 1 to Comparative Example 8

The resin for a negative electrode of a lithium ion battery, the slurry for a negative electrode of a lithium ion battery, the negative electrode of a lithium ion battery, and the lithium ion battery of each of comparative example 1 to comparative example 8 were prepared with the same steps as example 1. However, the difference is: the components and the usage amount of each thereof of the resin for a negative electrode of a lithium ion battery were changed (as shown in Table 3), wherein the compounds corresponding to the abbreviations in Table 3 are as shown in Table 1. Each of the obtained negative electrode and lithium ion battery was evaluated, and the results thereof are as shown in Table 3.

TABLE 2

| | | | Example 1 | 2 | 3 | 4 | 5 | 6 | 7 |
|---|---|---|---|---|---|---|---|---|---|
| core section (100 wt %) | second aromatic vinyl monomer (wt %) | SM | 45 | 45 | 50 | 40 | 40 | 43 | 45 |
| | conjugated diene monomer (wt %) | BD | 50 | 48 | 45 | 50 | 55 | 55 | 50 |
| | vinyl cyanide monomer (wt %) | AN | 5 | 7 | 5 | 10 | 5 | 2 | 5 |
| cladding layer (100 wt %) | ethylenically unsaturated carboxylic acid ester monomer (wt %) | MMA | 78 | — | — | 45 | 50 | 50 | 78 |
| | | BA | — | 55 | 50 | — | 20 | — | — |
| | | 2-EHA | — | — | 5 | — | — | — | — |
| | first aromatic vinyl monomer (wt %) | SM | 12 | 20 | 5 | 20 | 15 | 25 | 6 |
| | | α-MS | — | 5 | — | — | — | — | — |
| | ethylenically unsaturated carboxylic acid monomer (wt %) | MAA | 10 | 30 | 40 | — | 15 | 25 | 10 |
| | | AA | — | — | — | 20 | — | — | — |
| | | IA | — | — | — | 15 | — | — | — |
| | other copolymerizable monomers (wt %) | AN | — | — | — | — | — | — | 6 |
| | | AAD | — | — | — | — | — | — | — |
| | | BD | — | — | — | — | — | — | — |
| core section/cladding layer (parts by weight) | | | 70/30 | 75/25 | 80/20 | 70/30 | 75/25 | 80/20 | 70/30 |
| Evaluation method | Adhesion | | ○ | ○ | ○ | ○ | ○ | ○ | ○ |
| | Electrical properties | | ○ | ○ | ○ | ○ | ○ | ○ | ○ |

TABLE 3

| | | | Comparative example 1 | 2 | 3 | 4 | 5 | 6 | 7 | 8 |
|---|---|---|---|---|---|---|---|---|---|---|
| core section (100 wt %) | second aromatic vinyl monomer (wt %) | SM | 45 | 45 | 50 | 40 | 40 | 43 | 26 | 40 |
| | conjugated diene monomer (wt %) | BD | 50 | 48 | 45 | 50 | 55 | 55 | 48 | 43 |
| | vinyl cyanide monomer (wt %) | AN | 5 | 7 | 5 | 10 | 5 | 2 | 26 | 17 |
| cladding layer (100 wt %) | ethylenically unsaturated carboxylic acid ester monomer (wt %) | MMA | 42 | 85 | 50 | 48 | 75 | 45 | 63 | 17 |
| | | BA | — | — | 25 | — | — | — | — | — |
| | | 2-EHA | — | — | — | — | — | — | — | — |
| | first aromatic vinyl monomer (wt %) | SM | 20 | 5 | 2 | 27 | 20 | 10 | 31 | 34 |
| | | α-MS | — | — | — | — | — | — | — | — |
| | ethylenically unsaturated carboxylic acid monomer (wt %) | MAA | 38 | 10 | 23 | 20 | 5 | 45 | 4 | 4 |
| | | AA | — | — | — | 10 | — | — | — | — |
| | | IA | — | — | — | — | — | — | — | — |
| | other copolymerizable monomers (wt %) | AN | — | — | — | — | — | — | — | 15 |
| | | AAD | — | — | — | — | — | — | 2 | — |
| | | BD | — | — | — | — | — | — | — | 30 |
| core section/cladding layer (parts by weight) | | | 70/30 | 75/25 | 80/20 | 70/30 | 75/25 | 80/20 | 50/50 | 30/70 |
| Evaluation method | Adhesion | | X | — | ○ | X | X | — | X | X |
| | Electrical properties | | — | — | X | — | — | — | — | — |

[Evaluation Methods]

The methods of evaluating the negative electrode and the lithium ion battery of each of example 1 to example 7 and comparative example 1 to comparative example 8 are as follows:

1. Adhesion of Negative Electrode

A 1 cm×10 cm negative electrode was taken. Then, the negative electrode was bended such that one end thereof surrounded with a roll bar having a diameter of 1 mm. Next, with the negative electrode bended, the roll bar was rolled from one end of the negative electrode to another end (counts as bending once). After bending back and forth 10 times, desorption or peeling of the slurry on the copper foil was observed. The evaluation criteria are as shown below.

○: surface of the negative electrode is smooth and adhesion is good.

x: cracks appear on the surface of the negative electrode or the slurry peels off of the surface of the copper foil, indicating poor adhesion. Evaluation of electrical properties described below is not performed.

-: indicates stability of the solution formed by the emulsion polymerization reaction forming the core section is poor, and the solution containing the core section cannot be prepared. Evaluation of electrical properties described below is not performed.

2. Electrical Properties of Lithium Ion Battery

The electrical properties of the lithium ion battery were evaluated by charge/discharge performance. Charge/discharge cycles were respectively performed on the lithium ion batteries with a constant current/voltage in an environment of 25° C. One charge/discharge cycle is defined as charging the battery to 0.0 V (vs. Li$^+$/Li) with a constant current of 0.1 C, and then discharging the battery to the cut-off voltage of 2 V (vs. Li$^+$/Li) with a constant current of 0.1 C. Moreover, the electrical properties of the lithium ion battery were evaluated according to the battery capacity (milliamp hours per gram, mAh/g) after 50 charge/discharge cycles of the lithium ion battery at a temperature of 25° C. The evaluation criteria are as shown below.

○: maximum capacity ≥330 mAh/g.

×: maximum capacity <330 mAh/g.

-: poor adhesion or the solution containing the core section cannot be prepared. Evaluation of electrical properties is not performed.

<Evaluation Results>

Referring to Tables 2 and 3, in comparison to example 1 to example 7 in which the content of the ethylenically unsaturated carboxylic acid ester monomer in the resin for a negative electrode of a lithium ion battery forming the cladding layer is from 45 to 80 wt %, the adhesion of comparative examples 1 and 2 is poor or the solution containing the core section cannot be prepared. It can therefore be seen that, when the content of the ethylenically unsaturated carboxylic acid ester monomer forming the cladding layer is less than 45 wt %, the adhesion between the negative electrode layer formed by the slurry in the negative electrode and the copper foil (current collector) is poor. And when the content of the ethylenically unsaturated carboxylic acid ester monomer forming the cladding layer is greater than 80 wt %, the stability of the solution formed by the emulsion polymerization reaction forming the core section is poor, and the solution containing the core section cannot be prepared.

In comparison to example 1 to example 7 in which the content of the first aromatic vinyl monomer in the resin for a negative electrode of a lithium ion battery forming the cladding layer is from 5 to 25 wt %, although the adhesion between the negative electrode layer formed by the slurry in the negative electrode of comparative example 3 in which the content of the first aromatic vinyl monomer is less than 5 wt % and the copper foil (current collector) is good, since the dispersion of the active substance in the slurry is poor, the electrical properties of the lithium ion battery are poor. Moreover, the adhesion between the negative electrode layer formed by the slurry in the negative electrode of comparative example 4 in which the content of the first aromatic vinyl monomer is greater than 25 wt % and the copper foil (current foil) is poor.

In comparison to example 1 to example 7 in which the content of the ethylenically unsaturated carboxylic acid monomer in the resin for a negative electrode of a lithium ion battery forming the cladding layer is from 10 to 43 wt %, the adhesion between the negative electrode layer formed by the slurry in the negative electrode of comparative example 5 in which the content of the ethylenically unsaturated carboxylic acid monomer is less than 10 wt % and the copper foil (current collector) is poor; and in comparative example 6 in which the content of the ethylenically unsaturated carboxylic acid monomer is greater than 43 wt %, the stability of the solution formed by the emulsion polymerization reaction forming the core section is poor. As a result, the solution containing the core section cannot be prepared.

In the resin for a negative electrode of a lithium ion battery of comparative example 7, the content of the aromatic vinyl monomer forming the core section is less than 40 parts by weight; the content of the vinyl cyanide monomer forming the core section is greater than 10 parts by weight; the content of the aromatic vinyl monomer forming the cladding layer is greater than 25 wt %; the ethylenically unsaturated carboxylic acid monomer forming the cladding layer is less than 10 wt %; and the weight ratio of the core section and the cladding layer in comparative example 7 is 50:50. The adhesion between the negative electrode layer formed by the slurry in the negative electrode of comparative example 7 and the copper foil (current collector) is poor.

In the resin for a negative electrode of a lithium ion battery of comparative example 8, the content of the vinyl cyanide monomer forming the core section is greater than 10 parts by weight, the content of the ethylenically unsaturated carboxylic acid ester monomer forming the cladding layer is less than 45 wt %, the content of the aromatic vinyl monomer forming the cladding layer is greater than 25 wt %, the ethylenically unsaturated carboxylic acid monomer forming the cladding layer is less than 10 wt %, and the weight ratio of the core section and the cladding layer in comparative example 8 is 30:70. The adhesion between the negative electrode layer formed by the slurry in the negative electrode of comparative example 8 and the copper foil (current collector) is poor.

Based on the above, the invention provides a resin for a negative electrode of a lithium ion battery. In a thermoplastic resin composition, when the resin for a negative electrode of a lithium ion battery is applied in a negative electrode of a lithium ion battery, by controlling the ratio between each component in the core section and the cladding layer, the adhesion between the current collector and the negative electrode layer formed by the resin for a negative electrode of a lithium ion battery can be good. As a result, the electrical properties of the lithium ion battery are improved. Moreover, the resin for a negative electrode of a lithium ion battery is an environmentally friendly material. Accordingly, the resin for a negative electrode of a lithium ion battery, the resin composition for a negative electrode of a lithium ion battery, the slurry for a negative electrode of a lithium ion battery, and the negative electrode of a lithium ion battery fabricated thereby of the invention are suitable for preparing a lithium ion battery having good electrical properties.

Although the invention has been described with reference to the above embodiments, it will be apparent to one of the ordinary skill in the art that modifications to the described embodiments may be made without departing from the spirit of the invention. Accordingly, the scope of the invention is defined by the attached claims not by the above detailed descriptions.

What is claimed is:
1. A resin, comprising:
   a core section; and
   a cladding layer covering a surface of the core section,
   wherein the cladding layer is obtained by reacting a first monomer mixture, the first monomer mixture comprises an ethylenically unsaturated carboxylic acid ester monomer, a first aromatic vinyl monomer, and an ethylenically unsaturated carboxylic acid monomer,
   based on 100 wt % of the first monomer mixture, a content of the ethylenically unsaturated carboxylic acid ester monomer is from 45 to 80 wt %, a content of the first aromatic vinyl monomer is from 5 to 25 wt %, and a content of the ethylenically unsaturated carboxylic acid monomer is from 10 to 43 wt %.

2. The resin of claim 1, wherein the content of the ethylenically unsaturated carboxylic acid ester monomer is from 55 to 75 wt %.

3. The resin of claim 1, wherein the content of the first aromatic vinyl monomer is from 5 to 20 wt %.

4. The resin of claim 1, wherein the content of the ethylenically unsaturated carboxylic acid monomer is from 10 to 30 wt %.

5. The resin of claim 1, wherein based on 100 parts by weight of the resin, a content of the core section is from 70 to 80 parts by weight and a content of the cladding layer is from 20 to 30 parts by weight.

6. The resin of claim 1, wherein the core section is obtained by reacting a second monomer mixture, the second monomer mixture comprises a second aromatic vinyl monomer, a conjugated diene monomer, and a vinyl cyanide monomer,
   based on 100 wt % of the second monomer mixture, a content of the second aromatic vinyl monomer is from 40 to 50 wt %, a content of the conjugated diene monomer is from 45 to 55 wt %, and a content of the vinyl cyanide monomer is from 2 to 10 wt %.

7. A resin composition, comprising:
the resin of claim 1; and
a solvent.

8. A slurry, comprising:
the resin composition of claim 7; and
an active substance.

9. The slurry of claim 8, wherein the active substance comprises a conductive carbon material for a negative electrode of a lithium ion battery.

10. A negative electrode, comprising:
a current collector; and
a negative electrode layer located on a surface of the current collector and formed by processing steps of the slurry of claim 8.

11. A lithium ion battery, comprising:
a positive electrode;
the negative electrode of claim 10 separately disposed from the positive electrode;
an electrolyte located between the positive electrode and the negative electrode; and
a package structure covering the positive electrode, the negative electrode, and the electrolyte.

\* \* \* \* \*